United States Patent
Cheng et al.

(10) Patent No.: US 11,521,015 B2
(45) Date of Patent: Dec. 6, 2022

(54) IMAGE-RECOGNITION APPARATUS, IMAGE-RECOGNITION METHOD, AND NON-TRANSITORY COMPUTER-READABLE STORAGE MEDIUM THEREOF

(71) Applicant: Wistron Corp., New Taipei (TW)

(72) Inventors: Chih-Wei Cheng, New Taipei (TW); Tsai-Sheng Shen, New Taipei (TW); Kuang-Yu Wang, New Taipei (TW)

(73) Assignee: WISTRON CORP., New Taipei (TW)

( * ) Notice: Subject to any disclaimer, the term of this patent is extended or adjusted under 35 U.S.C. 154(b) by 419 days.

(21) Appl. No.: 16/885,614

(22) Filed: May 28, 2020

(65) Prior Publication Data

US 2021/0027105 A1    Jan. 28, 2021

Related U.S. Application Data

(60) Provisional application No. 62/877,375, filed on Jul. 23, 2019.

(30) Foreign Application Priority Data

Apr. 15, 2020  (TW) .................................. 109112602

(51) Int. Cl.
*G06V 10/776* (2022.01)
*G06K 9/62* (2022.01)
(Continued)

(52) U.S. Cl.
CPC ......... *G06K 9/6257* (2013.01); *G06K 9/6262* (2013.01); *G06N 20/00* (2019.01);
(Continued)

(58) Field of Classification Search
CPC .. G06V 10/774; G06V 10/776; G06T 3/4007; G06T 7/0002–0016; G06N 20/00–20
See application file for complete search history.

(56) References Cited

U.S. PATENT DOCUMENTS 10,140,553 B1   11/2018  Vasisht et al.
10,983,478 B2   4/2021   Cheng et al.
(Continued)

FOREIGN PATENT DOCUMENTS

AU    2002320676 B2    3/2005
CN    104677914 A      6/2015
(Continued)

OTHER PUBLICATIONS

Chinese language office action dated May 10, 2021, issued in application No. TW 109112603.
(Continued)

*Primary Examiner* — Sean T Motsinger
(74) *Attorney, Agent, or Firm* — McClure, Qualey & Rodack, LLP

(57) ABSTRACT

An image-recognition method is provided. The method includes the following steps: receiving structured data, wherein the structured data includes training-set data and testing-set data, and the structured data includes a plurality of groups, and each group includes one or more types, and each type includes a plurality of check-point images; training an artificial-intelligence (AI) model using the training-set data; inputting the testing-set data into the AI model to obtain a model evaluation of the AI model; and determining one or more first types with a lower overall recognition rate or a lower confidence level in the structured data, and deletes or corrects the check-point images in the one or more first types to update the structured data.

17 Claims, 9 Drawing Sheets

(51) Int. Cl.
  *G06T 3/40* (2006.01)
  *G06T 7/00* (2017.01)
  *G06N 20/00* (2019.01)
  *G06V 10/98* (2022.01)
  *G06V 10/774* (2022.01)

(52) U.S. Cl.
  CPC .......... *G06T 3/4007* (2013.01); *G06T 7/0004* (2013.01); *G06V 10/774* (2022.01); *G06V 10/776* (2022.01); *G06V 10/98* (2022.01); *G06T 2207/20081* (2013.01); *G06V 2201/06* (2022.01)

(56) References Cited

U.S. PATENT DOCUMENTS

| | | | | |
|---|---|---|---|---|
| 2019/0138786 | A1* | 5/2019 | Trenholm | G06K 9/6227 |
| 2019/0164017 | A1* | 5/2019 | Chen | G06K 9/6259 |
| 2019/0205620 | A1* | 7/2019 | Yi | G06V 10/454 |
| 2019/0215424 | A1* | 7/2019 | Adato | G06V 40/10 |
| 2019/0236531 | A1* | 8/2019 | Adato | G06F 16/288 |
| 2020/0302273 | A1* | 9/2020 | Chung | G06V 10/82 |
| 2020/0342328 | A1* | 10/2020 | Revaud | G06N 3/0454 |
| 2021/0150282 | A1* | 5/2021 | Chadha | G06T 3/40 |
| 2021/0166374 | A1* | 6/2021 | Banno | G06T 7/001 |

FOREIGN PATENT DOCUMENTS

| | | |
|---|---|---|
| CN | 106530284 A | 3/2017 |
| CN | 109190643 A | 1/2019 |
| TW | I664586 B | 7/2019 |

OTHER PUBLICATIONS

Indian language office action dated Sep. 15, 2021, issued in application No. IN 202024030047 (including English language translation).

Patent Application filed in Indian application No. IN 202024030016, published Jan. 29, 2021.

Chinese language office action dated Jan. 29, 2021, issued in application No. TW 109112604.

Non-Final Office Action dated Mar. 14, 2022, issued in application No. U.S. Appl. No. 16/885,594.

Non-Final Office Action dated Dec. 21, 2021, issued in application No. U.S. Appl. No. 16/885,576.

Indian language office action dated Jul. 20, 2021, issued in application No. IN 202024030016 (including English language translation).

* cited by examiner

IMAGE-RECOGNITION APPARATUS, IMAGE-RECOGNITION METHOD, AND NON-TRANSITORY COMPUTER-READABLE STORAGE MEDIUM THEREOF

CROSS REFERENCE TO RELATED APPLICATIONS

This application claims the benefit of U.S. Provisional Application No. 62/877,375, filed Jul. 23, 2019, and this application also claims priority of Taiwan Patent Application No. 109112602, filed on Apr. 15, 2020, the entirety of which are incorporated by reference herein.

BACKGROUND OF THE DISCLOSURE

Field of the Disclosure

The present disclosure relates to automated optical inspection, and, in particular, to an image-recognition apparatus, an image-recognition method, and a non-transitory computer-readable storage medium thereof.

Description of the Related Art

Automated optical inspection (AOI) is a common representative method in industrial processes that can be used, for example, to inspect to-be-tested items such as printed circuit boards (PCBs), flat display panels, semiconductor devices, electronic products, optical apparatuses, mechanical mechanisms, molds, etc. For example, the AOI system can use optical instruments to obtain the surface status of the finished product, and then use computer image-processing technology to detect defects such as foreign objects or abnormal patterns. Because it is a non-contact inspection, it can check semi-finished products at the intermediate node of the production line. For example, bare PCBs and assembled PCBs can be regarded as intermediate nodes.

The automatic optical inspection system can be used in the manufacturing or assembly process of the to-be-tested object to check different features of the to-be-tested object or semi-finished product, where the features may be but not limited to, integrity (e.g., fracture, continuity, and crack) and size of the conductor (e.g., wires), size and position of the insulator or substrate, size and position of holes, size and position of vias, conductor pitch, line width and length, solder condition, component position, solder joint defects, etc.

However, the conventional AOI system will set quite strict judgement condition to exclude unqualified products, but many qualified products are judged as defective by the conventional AOI system in the aforementioned process. When manufacturing a large number of products on the factory side, there is no effective method to detect products that are mistakenly judged as defective.

BRIEF SUMMARY OF THE DISCLOSURE

A detailed description is given in the following embodiments with reference to the accompanying drawings.

In an exemplary embodiment, a computer program product comprising a non-transitory computer-readable storage medium storing an artificial-intelligence (AI) image-recognition program which is executed by a computer to cause the computer to function as: a model-training module, configured to receive structured data, wherein the structured data comprises training-set data and testing-set data, and the model-training module trains an artificial-intelligence (AI) model using the training-set data, and the structured data comprises a plurality of groups, and each group comprises one or more types, and each type comprises a plurality of check-point images; and a model-evaluation module, configured to input the testing-set data into the AI model to obtain a model evaluation of the AI model, wherein the model-evaluation module further determines one or more first types with a lower overall recognition rate or a lower confidence level in the structured data, and deletes or corrects the check-point images in the one or more first types to update the structured data.

In some embodiments, the check-point images in each group of the structured data generated by the image-generating module have a first number, and a second number of check-point images in each type of each group is obtained by dividing the first number by a number of types in each group.

In some embodiments, the model-training module divides the structured data into the training-set data and the testing-set data according to a predetermined ratio.

In some embodiments, the AI model comprises an input layer, a transfer model, a classification layer, and an output layer, and the model-training module defines a plurality of strategic parameters during a training procedure for the transfer model, wherein the strategic parameters includes a type of an optimizer, a learning rate, a number of epochs, and a batch size. The model-training module further defines an image resolution used by the AI model, and the image resolution meets image-resolution requirements of the transfer model.

In some embodiments, in response to size of the check-point images in the structured data being different from the image resolution used by the AI model, the model-training module performs interpolation on the check-point images in the structured data to scale the check-point images to the image resolution used by the AI model. During a training phase of the AI model, the model-training module generates current training accuracy and current testing accuracy, and compares the current training accuracy and the current testing accuracy to determine whether the AI model is overfitting.

In some embodiments, when a training phase of the AI model starts, the model-training module displays a training-loss curve and a training-accuracy curve of the AI model.

In some embodiments, the model-evaluation module divides a number of check-point images in each type determined by the AI model by a number of check-point images in each type of the testing-set data to obtain a first accuracy for each type, and divides a number of occurrences, that recognition results of the AI model are consistent with the check-point images labeled in each type of the testing-set data, by the number of check-point images in each type determined by the AI model to obtain a second accuracy, wherein the model-evaluation module further determines recognition capability of the AI model for the check-point images in each type of the testing-set data according to the first accuracy and the second accuracy for each type in the testing-set data.

In some embodiments, the model-evaluation module further filters out the check-point images that are erroneously labeled or have multiple labels.

In some embodiments, the model-evaluation module further executes a first data-cleaning process to delete the check-point images that are erroneously labeled from the structured data to update the structured data. The model-evaluation module further executes a second data-cleaning process to filter out the check-point images that have multiple labels, and deletes the check-point images from the structured data to update the structured data.

In some embodiments, the model-training module further moves the check-point images that are erroneously labeled or have multiple labels to a directory of a to-be-corrected type to update the structured data.

In some embodiments, after the model-evaluation module has executed the first data-cleaning procedure and the second data-cleaning procedure and has updated the training-set data, the model-evaluation module further calls an image-labeling module or an image-classification module of the AI image-recognition program to check the filtered check-point images one by one for re-labeling. After group labels or types of the filtered check-point images are changed after re-labeling, the model-evaluation module further moves the check-point images with corrected labels to a corrected-type directory In some embodiments, wherein the computer program product further comprises an image-generating module. The model-evaluation module further calls the image-generating module to further view each check-point image in the one or more first types, and generate a plurality of simulated check-point images for the one or more first types to update the structured data. The model-training module further divides new training-set data from the updated structured data to retrain the AI model.

In another exemplary embodiment, an image-recognition method is provided. The method includes the following steps: receiving structured data, wherein the structured data comprises training-set data and testing-set data, and the structured data comprises a plurality of groups, and each group comprises one or more types, and each type comprises a plurality of check-point images; training an artificial-intelligence (AI) model using the training-set data; inputting the testing-set data into the AI model to obtain a model evaluation of the AI model; and determining one or more first types with a lower overall recognition rate or a lower confidence level in the structured data, and deletes or corrects the check-point images in the one or more first types to update the structured data.

In yet another exemplary embodiment, an image-recognition apparatus is provided. The image-recognition apparatus includes a non-volatile memory and a processor. The non-volatile memory is configured to store a model-generating program. The processor is configured to execute the model-generating program to perform the following steps: receiving structured data, wherein the structured data comprises training-set data and testing-set data, and the structured data comprises a plurality of groups, and each group comprises one or more types, and each type comprises a plurality of check-point images; training an artificial-intelligence (AI) model using the training-set data; inputting the testing-set data into the AI model to obtain a model evaluation of the AI model; and determining one or more first types with a lower overall recognition rate or a lower confidence level in the structured data, and deletes or corrects the check-point images in the one or more first types to update the structured data.

BRIEF DESCRIPTION OF THE DRAWINGS

The present disclosure can be more fully understood by reading the subsequent detailed description and examples with references made to the accompanying drawings, wherein.

DETAILED DESCRIPTION OF THE DISCLOSURE

The following description is made for the purpose of illustrating the general principles of the disclosure and should not be taken in a limiting sense. The scope of the disclosure is best determined by reference to the appended claims.

It should be understood that the words "comprising", "including" and the like used in this specification are used to indicate the existence of specific technical characteristics, numerical values, method steps, work processes, components and/or components, but not It does not exclude that you can add more technical features, values, method steps, job processing, components, components, or any combination of the above.

The terms such as "first", "second", and "third" are used in the claims to modify the elements in the claims, and are not used to indicate that there is a priority order, prior relationship, or is a component before another component, or the time sequence when performing method steps, only used to distinguish components with the same name.

Figure 1:
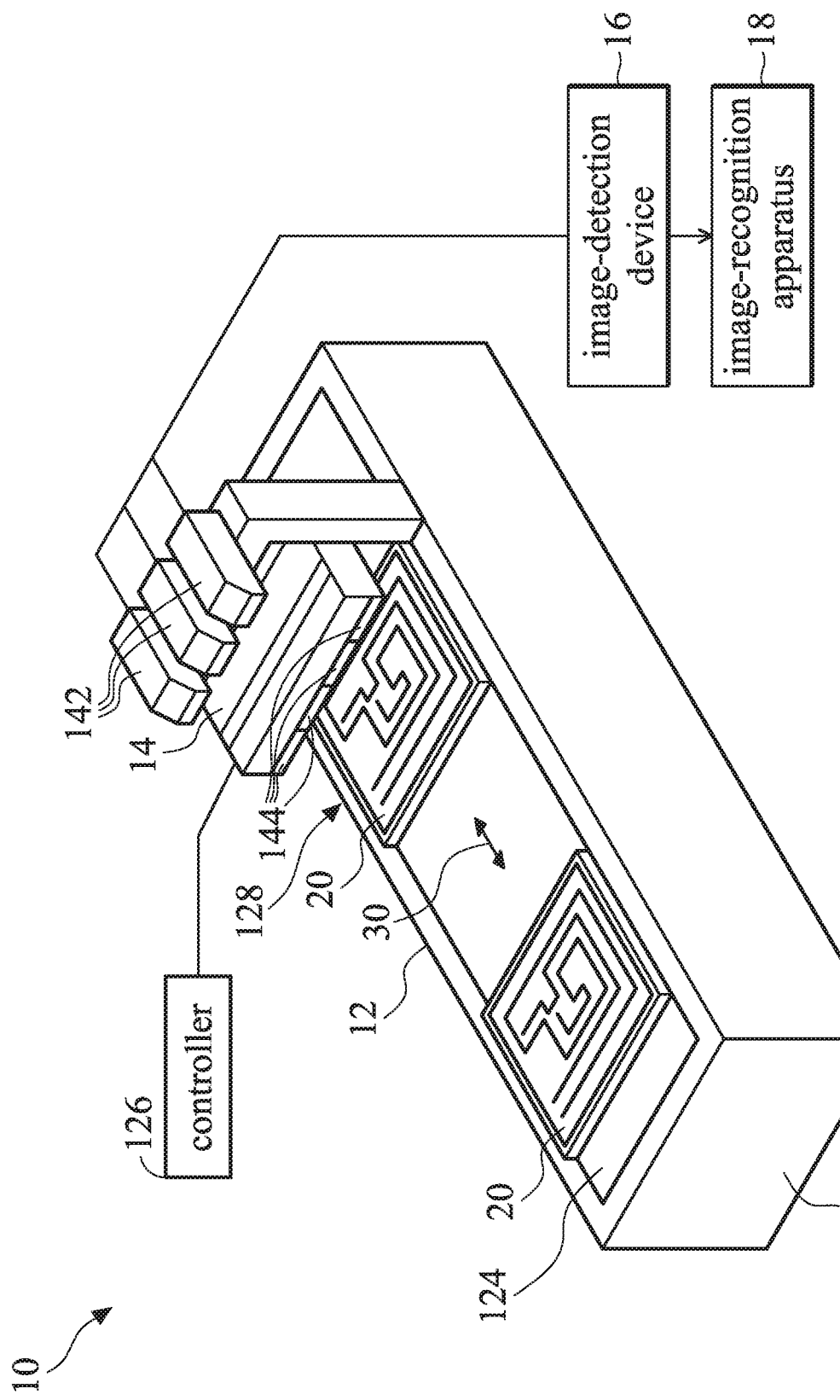
FIG. 1 is a diagram of an automated-optical-inspection system in accordance with an embodiment of the disclosure.

FIG. 1 is a diagram of an automated-optical-inspection system in accordance with an embodiment of the disclosure. As depicted in FIG. 1, the AOI system 10 includes an automatic conveying device 12, an AOI device 14, an image-inspection device 16, and an image-recognition apparatus 18. The automatic conveying device 12 includes, for example, a casing 122 and a driving mechanism 124. The driving mechanism 124 is disposed above the casing 122 to sequentially deliver one or more devices under test (DUTs) 20 a detection-positioning point 128 on the casing 122, so that the AOI device can take a picture of the DUT 20 or perform an optical-inspection procedure to obtain one or more object images. The driving mechanism 124 can be realized by, for example, a conveyor belt or a robot arm, and the direction of the driving mechanism 124 to transport the DUT 20 (as indicated by arrow 30) is controlled by the controller 126. For example, the controller 126 may be implemented by a microcontroller, a programmable logic controller (PLC), or a personal computer, but the disclosure is not limited thereto.

The AOI device 14 includes one or more image sensors 142 and one or more illumination devices 144, wherein the illumination device 144 is used to provide light to the DUT 20 on the detection-positioning point 128. The image sensor 142 is used to take a picture of the DUT 128 on the detection-positioning point 128 to obtain the object image. The illumination device 144 can be implemented by, for example, a light-emitting diode (LED) or different types of light sources, and the image sensor 142 can be implemented by a charge-coupled device (CCD) sensor or a complementary-metal-oxide-semiconductor (CMOS) sensor, but the disclosure is not limited thereto. In addition, the overall field of view (FOV) of the one or more image sensors 142 in the AOI device 14 may cover the DUT 20 on the detection-positioning point 128.

The image-detection device 16 may be implemented, for example, by a personal computer or a server. In an embodiment, the image-detection device 16 is configured to obtain the object image of the DUT 20 from the image sensor 142, perform image pre-processing on the object image, and perform optical image recognition on the processed object image, thereby determining whether one or more check points in the DUT are defective.

For example, the aforementioned image pre-processing may include but not limited to noise cancellation, enhancing image contrast, enhancing image edges, capturing image features, image scaling and rotation, image alignment and calibration, image transformation, etc. The image-detection device 16 may use relevant image pre-processing techniques on the object image, and it is easier to perform subsequent image analysis and image recognition on the processed object image. In some embodiments, the image-detection device 16 can be omitted, and the aforementioned image pre-processing may be performed by the image-recognition apparatus 18. In some other embodiments, the image-detection device 16 can be integrated into the image-recognition apparatus 18.

In the first embodiment, the image-detection device 16 is configured to obtain the object image of the DUT 20 from the image sensor 142, and perform image pre-processing on the object image. Then, the image-detection device 16 transmits the processed object image to the image-recognition apparatus 18 for subsequent image processing.

In the second embodiment, the image-detection device 16 may perform machine-vision software to divide the processed object image into one or more check-point images, and perform image recognition on each check-point image, wherein the machine-vision software may preset image-recognition conditions corresponding to each check-point image of the object image of the DUT 20, thereby recognizing the defective status of each check point. Taking a printed circuit board (PCB) as an example, the defective status of each check point may include: missing component, skew, tombstone, wrong component, foreign component, flipped component, wrong polarity, lifted lead, lead defective, solder bridge, insufficient solder, short circuit, false welding (air welding), cold welding, etc., but the disclosure is not limited thereto. After setting image-recognition condition corresponding to DUTs of different types, the image-detection device 16 may transmit the check-point images in which the defective status is recognized to the image-recognition apparatus 18 for subsequent processing. In some embodiments, the image-recognition apparatus may also obtain the check-point images or object images from a cloud database (not shown in FIG. 1), but the disclosure is not limited thereto. For convenience of description, the DUT 20 in the following embodiments is described using a PCB as an example.

Figure 2:
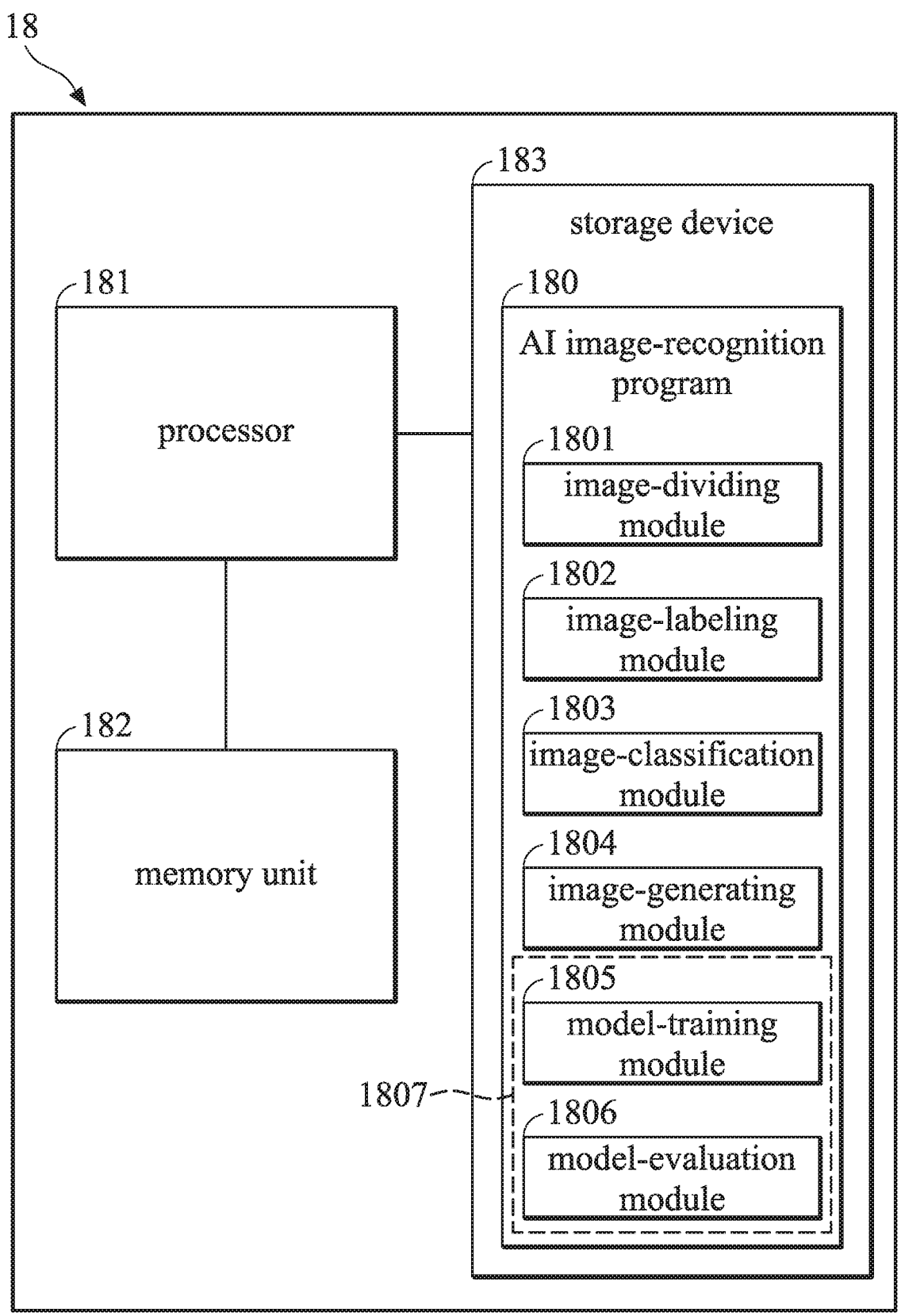
FIG. 2 is a block diagram of an image-recognition apparatus in accordance with an embodiment of the disclosure.

FIG. 2 is a block diagram of an image-recognition apparatus in accordance with an embodiment of the disclosure.

The image-recognition apparatus 18 can be implemented by one or more personal computers, servers, or other types of computing apparatuses. The image-recognition apparatus 18 may include a processor 181, a memory unit 182, and a storage device 183. The processor 181, for example, may be implemented by a central processing circuit (CPU) or a general-purpose processor, but the disclosure is not limited thereto. The memory unit 182 is a volatile memory such as a static random access memory (SRAM) or a dynamic random access memory (DRAM).

The storage device 183 may be a non-volatile memory such as a hard-disk drive (HDD), a solid-state disk, a flash memory, a read-only memory, an erasable programmable read-only memory (EPROM), an electrically erasable programmable read-only memory (EEPROM), or an e-fuse, but the disclosure is not limited thereto.

The storage device 183 stores an artificial-intelligence (AI) image-recognition program 180 that is configured to perform corresponding processing on the processed object image from the image-detection device 16, or on the check-point images that are recognized as having a defective status. For example, the AI image-recognition program 180 may include an image-dividing module 1801, an image-labeling module 1802, an image-classification module 1803, an image-generating module 1804, a model-training module 1805, and a model-evaluation module 1806. The processor 181 may load the AI image-recognition program 180 from the storage device 183 to the memory unit 182 for execution, thereby controlling and coordinating functions corresponding to modules 1801 to 1806.

The image-dividing module 1801 may be configured to cut the AOI object image from the image-detection device 16 to obtain the check-point image corresponding to each check point on the DUT 20. It should be noted that, in the second embodiment, since the image-detection device 16 transmits the check-point image recognized as the passing status or defective state to the image-recognition apparatus 18, it is not necessary for the image-dividing module 1801 to process the aforementioned check-point images. Accordingly, the image-dividing module is suitable for the case of the first embodiment.

In some embodiments, after the image-detection device 16 has transmitted the AOI object image to the image-recognition apparatus 18, the image-dividing module 1801 may first load the AOI object image, and the user interface of the image-dividing module 1801 can be used to set reference points, labeling range, search range, and range and number of check points, where each set of different settings can be saved as a corresponding template. Because there may be pixel shifts between images of different AOI object images from the image-detection device 16, the image-dividing module 1802 needs to set a larger search range outside each labeling range, and the relative positions of different check points can be set within each labeling range. In addition, the labeling range can be regarded as a positioning point or positioning range. When the AOI object images of the same DUT 20 are input into the image-dividing module 1801, the default search range of the template currently being used can be used to find the positioning points (i.e., labeling range), and the AOI object image can be divided into a plurality of check-point images corresponding to the check points according to the relative positions of each check point within the labeling range, wherein the filename of each check-point image may include a name, time, position, number, etc. of the DUT 20.

The image-labeling module 1802 may be configured to obtain the check-point image corresponding to each check point from the image-dividing module 1801 or the image-detection device 16, wherein the check-point image is not labeled or classified yet. For example, the image-labeling module 1802 may load the check point images in batches, for example, 8 check-point images (not limited) are in a batch. In some embodiments, the operator may label each check-point image in each batch, and the image-labeling module 1802 may generate a user interface to display each check-point image in the current batch, and obtains the label corresponding to each check-point image, wherein the aforementioned label may include a "pass" state or defective statuses (e.g., NG1, NG2, NG3, . . . , NGN, etc.). In some other embodiments, the image-labeling module 1802 may include an image-recognition function that is configured to perform image recognition on each check-point image to determine the status of each check-point image, such as the pass state or defective state. Taking a printed circuit board (PCB) as an example, the defective status of each check point may include: missing component, skew, tombstone, wrong component, foreign component, flipped component, wrong polarity, lifted lead, lead defective, solder bridge, insufficient solder, short circuit, false welding (air welding), cold welding, etc., but the disclosure is not limited thereto.

Accordingly, after labeling each check-point image through the image-labeling module 1802, different groups of check-point images can be obtained, for example, each of the pass state and defective states NG1, NG2, NG3, . . . , NGN, etc. can be regarded as different groups, and the image-labeling module 1802 may store the check-point images in different groups into different sub-directories.

The image-classification module 1803 is configured to allow the operator to classify the check-point images in each group labeled by the image-labeling module 1802. The image classification module 1803 can, for example, classify a plurality of check-point images that have high degree of similarity in content or attributes into the same group. In another embodiment, the image-classification module 1803 may set a similarity threshold, and generate another user interface to display the check-point images in each group. For example, the image-classification module 1803 can set a similarity threshold, and calculate the similarity between each check-point image in each group and a reference image in at least one type, and display the check-point images that have similarity values higher than the similarity threshold in each group. Specifically, the user may classify at least one check-point image (e.g., can be regarded as a reference image) in the "pass" group into a specific type. During classifying the check-point images in each group, the image-classification module 1803 may calculate the similarity values between the pre-classified check-point image and each unclassified check-point image in each group, and filter the check-point images having similarity values higher than the similarity threshold. The image-classification module 1803 will display the filtered check-point images on the user interface, and perform the classification process on the filtered check-point images. The unclassified check-point images in other groups can be classified into corresponding types in a similar manner.

For example, a resistor may have a higher similarity with another resistor, but a resistor may have a lower similarity with a capacitor. In response to the similarity between each check-point image in each group and a reference image in a specific type in each group being higher than the similarity threshold, the image-classification module 1803 may classify each check-point image having a similarity higher than the similarity threshold in each group to the same type. After performing the aforementioned process, the corresponding type of each check-point image can be obtained. If groups labeled by the image-labeling module 1802 can be divided into four groups such as "PASS", "NG1", "NG2", and "NG3", the image-classification module 1803 may further classify each check-point image in each of the four groups into a plurality of types, such as the similarity values between different components can be used as the classification criterion, and the same or similar components can be classified into the same type. For example, the image-classification module 1803 may classify the check-point images of the resistors, capacitors, and other components in the "PASS" group respectively into Type 1, Type 2, and Type 3. Similarly, the image-classification module 1803 may also classify the check-point images of the resistors, capacitors, and other components in each of the NG1, NG2, and NG3 groups respectively into Type 1, Type 2, and Type 3 in the corresponding group of NG1, NG2, and NG3 groups.

After the aforementioned image-classification operation is completed, the image-classification module 1803 can obtain group-type structured data (e.g., first structured data) and each type in each group may include corresponding numbers of check points. For example, the PASS-Type1 group-type may include check points 1, 3, and 5, and the PASS-Type2 group-type may include check point 2, and the PASS-Type3 group-type may include check points 4 and 6.

Figure 3:
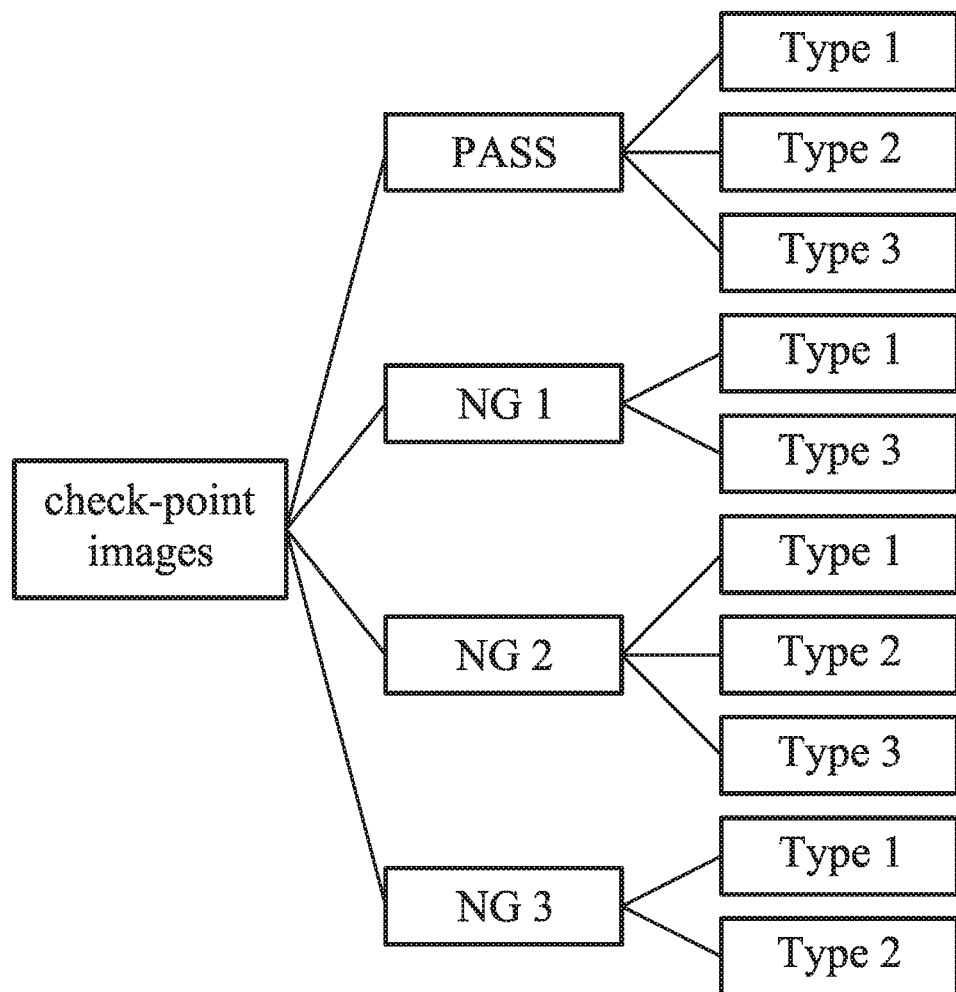
FIG. 3 is a diagram of the first structured data in accordance with an embodiment of the disclosure.

The structured data obtained from the image-classification operation is shown in FIG. 3. The image-classification module 1803 can output the structured data and its corresponding information (e.g., numbers of check-point images) and check-point images as a classification file, and write the classification file in the storage device 183. In the classification file, the name of each group can be set as main directories, and the name of each type in each group can be set as sub-directories, and each sub-directory may include the check-points images and their numbers after image classification. In addition, the classification file generated by the image-classification module 1803 can be used by the image-recognition apparatus 18 for subsequent use. For example, the user may read the previously stored classification file through the user interface of the image-classification module 1803, so the image-classification module 1803 can use the information corresponding to the classification file of the structured data to classify the check-point images generated by the image-dividing module 1801 or the check-point images received from the image-recognition apparatus 16.

It should be noted that, in the aforementioned embodiment, not every defective status may include all types. For example, if group NG1 indicates that the wrong polarity of the components on the PCB, the NG-Type1 group-type may indicate wrong polarity of capacitors. However, the resistors do not have the problem of wrong polarity, and thus group NG1 does not include the type Type2, as shown in FIG. 3.

The image-generating module 1804 is configured to perform image generation on the one or more group-types generated by the image-classification module 1803 so as to solve the problem of unevenness in the number of samples of the check-point images of some group-types. For the classification results of the group-types of the check-point images of the DUT 20 generated by the aforementioned procedure, the number of check-point images in each group-type is not necessarily even.

For example, with regard to the AI model in the model-training module 1805, it requires a huge amount of data and samples during the training phase. If the model-training module 1805 trains the AI model directly using the classification result (i.e., the first structured data) of the group-types generated by the image-classification module 1803, the AI model may have a low recognition rate, or cause misjudgment or insufficient confidence level.

Accordingly, the image-generating module 1804 may perform image generation on the one or more group-types generated by the image-classification module 1803, so that the number of check-point images in each group-type is even. For example, the image-generating module 1804 can allow the user to preset the range of various image parameters for image generation through the user interface, where the image parameters may include, but are not limited to, the brightness or red/green/blue pixels, contrast, contrast and gamma, rotation angle, pixel offset values along the X-axis and Y axis, sharpness, blurriness, scaling ratio, etc. In an embodiment, the range of the rotation angle can be set to be within −10 degrees to +10 degrees, and the pixel offset value along the X-axis can be set to be within −10 pixels to +10 pixels, and the pixel offset value along the Y-axis can be set to be within −10 pixels to +10 pixels. Other unchanged image parameters can use the preset values of the image-generating module 1804.

For example, the image-generating module 1804 may read the structured data (e.g., the first structured data) including one or more group-types generated by the image-classification module 1803, and collect statistics on the number of check-point images in each group-type. In order to allow the AI model of the model-training module 1805 to achieve better training results and model evaluation, it is better to have a greater and even number of check-point images in each group-type. For example, the user may set the number of check-point images of the selected group-type to be increased by X or increased to Y through the user interface of the image-generating module 1804, so that the numbers of check-point images in different types in the same group can be even, thereby generating second structured data.

Specifically, the check-point images in each group-type of group-type structured data (e.g., the first structured data) generated by the image-classification module 1803 can be regarded as original check-point images, and the check-point images randomly generated by applying different ranges of image parameters can be regarded as simulated check-point images. For example, if types Type1, Type2, and Type3 in the PASS group originally have 500, 250, and 100 original check-point images, respectively, and the target number of images set by the image-generating module 1804 is 1000 (i.e., X=1000, increased to 1000 images), after the image-generating module 1804 processes the types Type1, Type2, and Type3 in the PASS group, the number of check-point images in types Type1, Type2, and Type3 are changed to 1000. For example, the PASS-Type1 group-type may include 500 original check-point images and 500 simulated check-point images, and the PASS-Type2 group-type may include 250 original check-point images and 750 simulated check-point images, and the PASS-Type3 group-type may include 1000 original check-point images and 0 simulated check-point images. That is, after being processed by the image-generating module 1804, the number of check-point images in each type of PASS group is even. Meanwhile, the PASS group may include 3000 check-point images. Accordingly, if the sum of the number of original check-point images and the simulated check-point images in the first group is equal to a first number (e.g., 3000), the sum of the number of original check-point images and the simulated check-point images in each of the other groups is also equal to the first number.

Similarly, the image-generating module 1804 also performs a corresponding image-generating process on groups NG1, NG2, and NG3. That is, after being processed by the image-generating module 1804, each of groups NG1, NG2, and NG3 includes 3000 check-point images. If group NG1 only includes types Type1 and Type3, each of the types Type1 and Type3 includes 1500 check-point images. Similarly, group NG3 may only include types Type1 and Type2, and each of the types Type1 and Type2 includes 1500 check-point images. In addition, since group NG2 includes types Type1, Type2, and Type3, after being processed by the image-generating module 1804, each of the types Type1, Type2, and Type3 includes 1000 check-point images. In some embodiments, the image-generating module 1804 may, for example, save the simulated check-point images of each group-type generated by the image-generating process into other sub-directories to distinguish them from the original check-point images. In other words, the sum of the number of original check-point images and the number of simulated check-point images in each group of each group is equal to the first number (e.g., 3000) divided by the number of types in each group (e.g., two types are in group NG1, and 3 types are in group NG2).

The model-generating program 1807 may include a model-training module 1805 and a model-evaluation module 1806. The model-training module 1805 is configured to allow an AI model to perform model training using training-set data. The model-evaluation module 1806 is configured to evaluate the performance of the trained AI model using the testing-set data of the second structured data. That is, the testing-set data can be input into the trained AI model to obtain a model evaluation of the AI model.

Figure 4A:
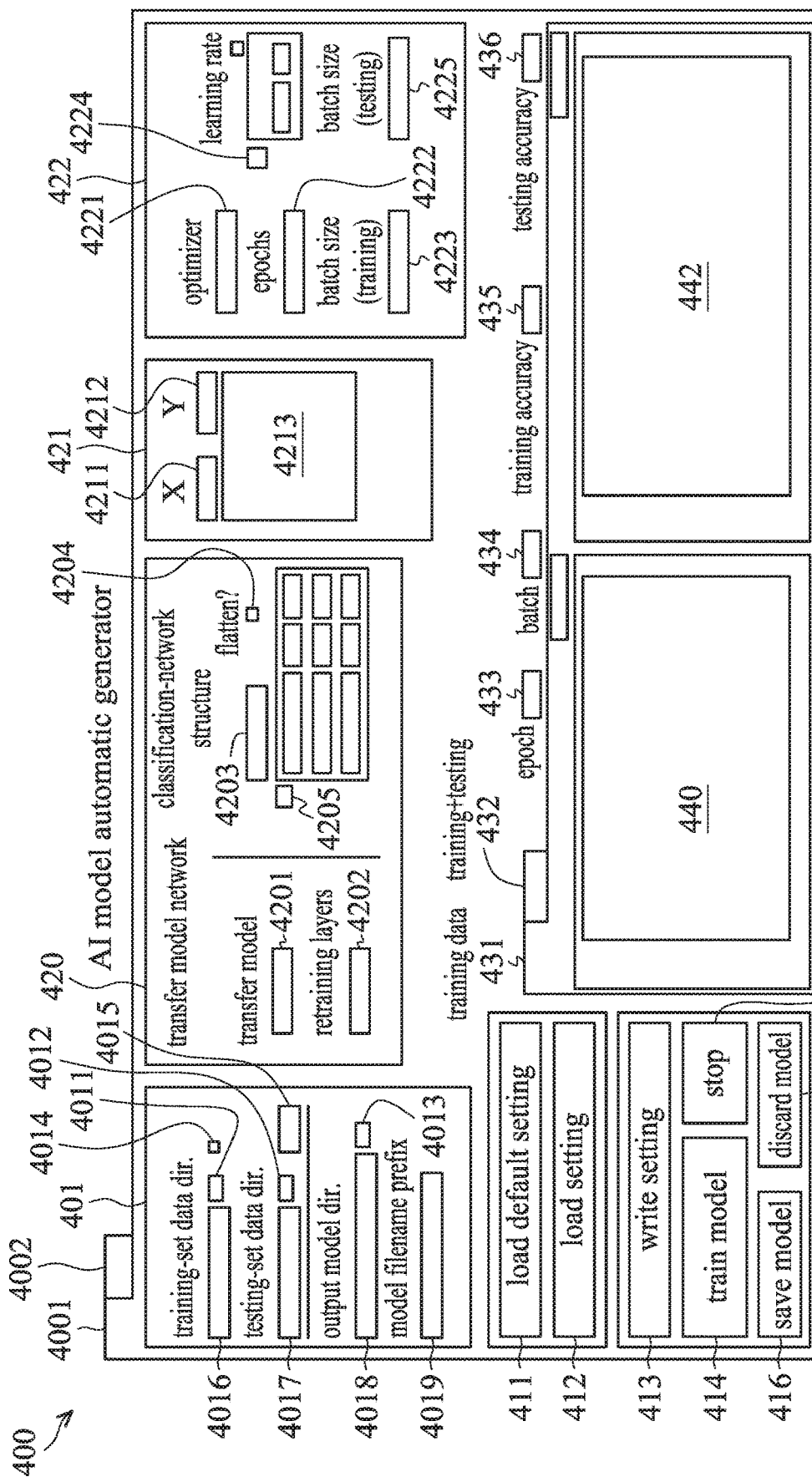
FIG. 4A is a diagram of the user interface of the module-generating program in accordance with an embodiment of the disclosure.
Figure 4B:
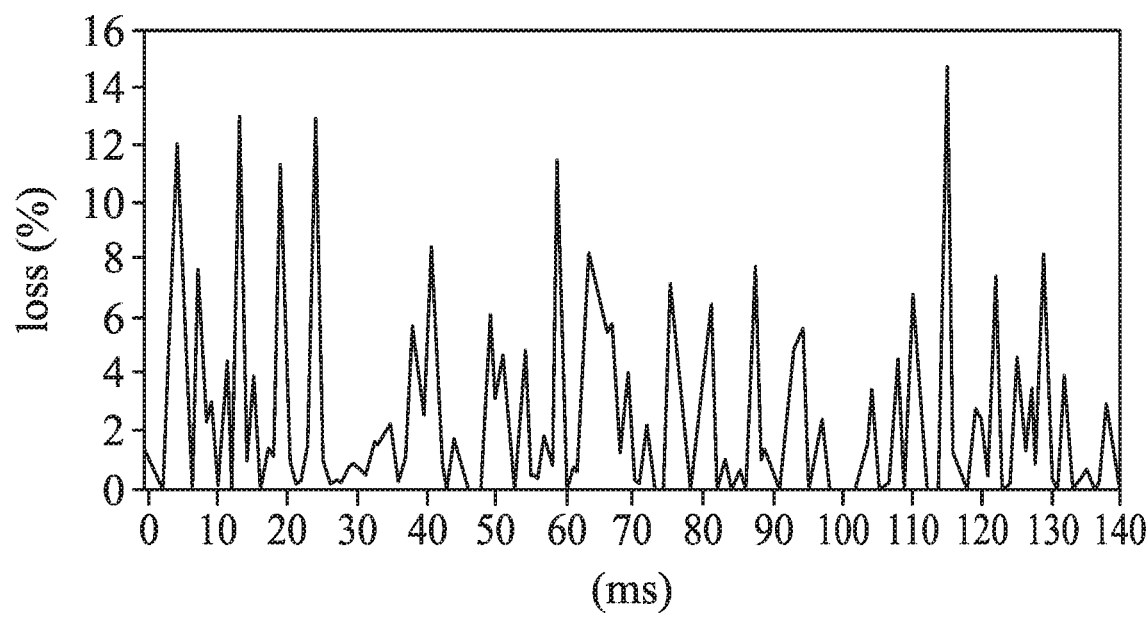
FIGS. 4B and 4C are diagrams of the training-loss curve and training-accuracy curve in accordance with the embodiment of FIG. 4A.
Figure 4C:
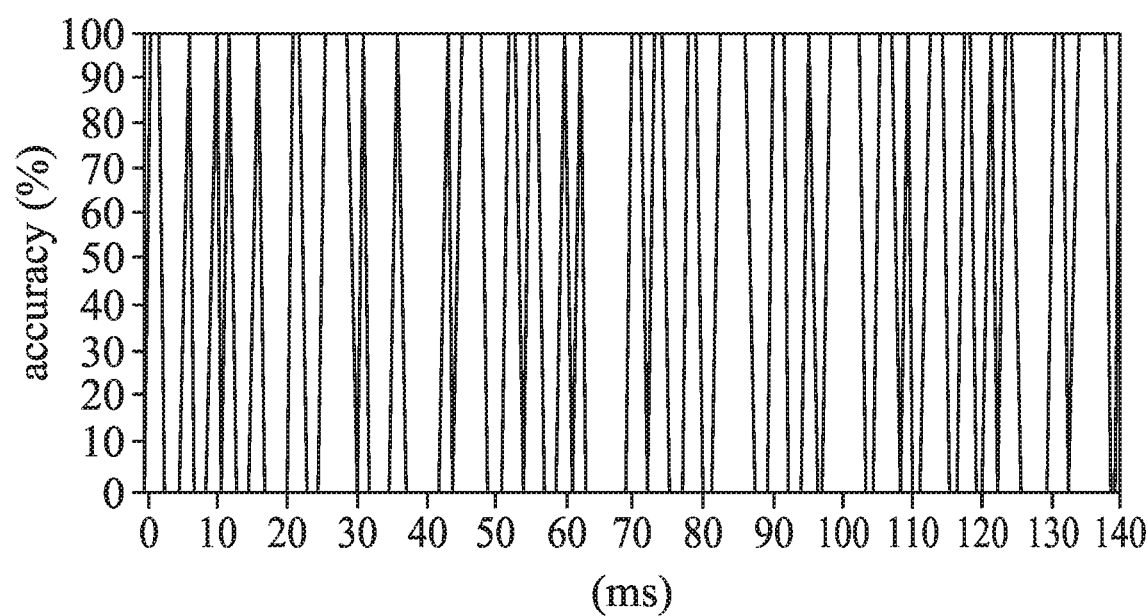
Figure 5:
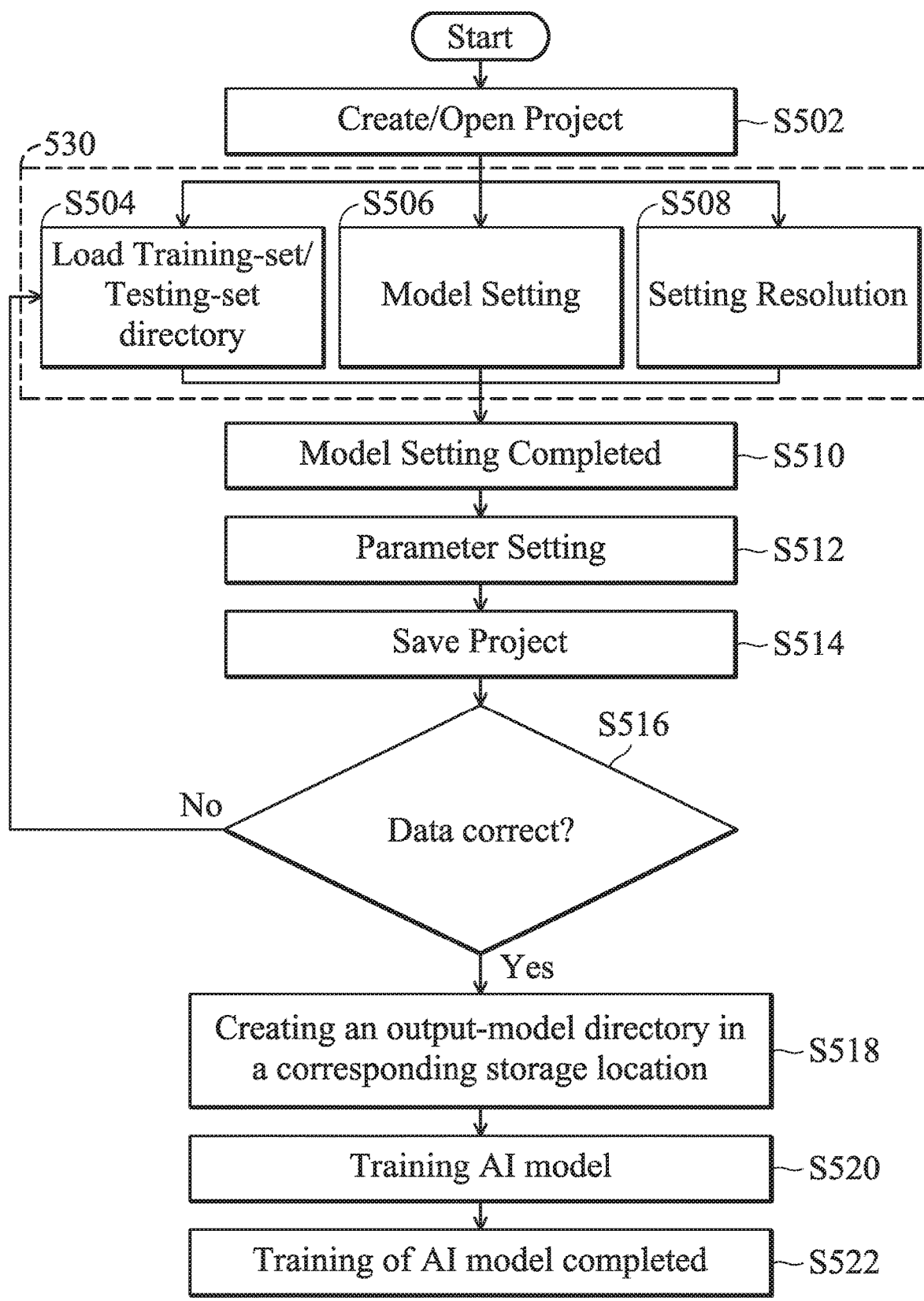
FIG. 5 is a diagram of the operation procedure of the model-training module in accordance with an embodiment of the disclosure.

FIG. 4A is a diagram of the user interface of the module-generating program in accordance with an embodiment of the disclosure. FIGS. 4B and 4C are diagrams of the training-loss curve and training-accuracy curve in accordance with the embodiment of FIG. 4A. FIG. 5 is a diagram of the operation procedure of the model-training module in accordance with an embodiment of the disclosure.

Referring to FIG. 2, FIG. 4A, and FIG. 5, the model-training module 1805 uses "transfer learning" technology to create an AI model, wherein the AI model may, for example, include an input layer, a transfer model, a classification layer, and an output layer, and the user may set the parameters corresponding to the input layer, transfer model, classification layer, and output layer through the user interface 400 of the model-generating program 1807. For example, the user may select buttons 4001 or 4002 on the user interface 400 of the model-generating program 1807 to switch between the user interfaces of the model-training module 1805 or model-evaluation module 1806. When the user selects button 4001, the user interface 400 is switched to the user interface of the model-training module 1805, as shown in FIG. 4A. The "Project" button on the upper toolbar of the user interface 400 can be selected to create a new project or open an existing project (step S502).

For example, the training-set data and testing-set data used in the training phase of the AI model should be different, so that the AI model is less likely to produce "overfitting" when recognizing the results. In an embodiment, the second structured data generated by the image-generating module 1804 can be divided into a training-set data and a testing-set data that are stored in different directories.

For example, block 530 can be regarded as a model-training setting phase, and steps S504, S506, and S508 can be simultaneously performed or sequentially in combination of different orders. Buttons 4011 and 4012 in block 401 can be respectively used to set the source-directory path of the training-set data and the testing-set data (e.g., can be respectively displayed in fields 4016 and 4017) to load the training-set directory and testing-set directory. Button 4013 can be used to set the path of the output model directory, which can be displayed in field 4018, and field 4019 can be filled with the prefix of the model filename.

In another embodiment, the second structured data generated by the image-generating module 1804 does not specifically distinguish between training-set data and testing-set data, and the model-training module 1805 can select the directory of the second structured data, and the check-point images in each group-type of second structured data can be divided into the training-set data and testing-set data according to a preset distribution ratio of the training-set data. For example, the distribution ratio of the training-set data is 0.3, the model-training module 1805 may use 30% of the check-point images in each group-type in the second structured data as the training-set data, and the remaining 70% of check-point images in each group-type in the second structure data are used as the testing-set data.

In blocks 420, 421, and 422, different parameters of the AI model can be set. For example, block 420 can be used to create parameters corresponding to the AI model. The model-training module 1805 may include a plurality of transfer models such as MobileNet, ResNet, InceptionV3, InceptionResNetV2, NASNetMobile, NASLarge, Xception, and other dozens of AI models. In step S506, model setting is performed. For example, field 4201 can be used to select one of the AI models to be trained, and fields 4202 and 4203 can be respectively filled with the number of retraining layers and the number of layers of the fully-connected layers in the classified network structure. Field 4204 can be checked whether to activate the flattening function. In addition, the up and down buttons next to field 4205 can be used to adjust the number of neurons in each fully-connected layer in the AI model, and the number of neurons increased or decreased is display in field 4205. Whether the dropout function is introduced for each fully-connected layer is optional, and there is no mandatory setting. With regard to the output layer of the AI model, the model-training module 1805 may automatically read the directory name of the first layer of the input data as the classification label according to the data structure of the input data (e.g., the second structured data), thereby automatically establishing the output layer.

In step S508, resolution setting is performed. For example, fields 4211 and 4212 in block 421 can be used to set the image resolution on the X-axis and Y-axis for training the AI model, respectively. It should be noted that the AI model selected in field 4201 may have a limit of image resolution corresponding to the transfer model (e.g., feature network), and block 4213 can display the limits of image resolutions of the feature networks in different AI models, as shown in Table 1:

TABLE 1

| Feature Network | Image Resolution |
| --- | --- |
| InceptionV3 | >=75 |
| InceptionResNetV2 | >=75 |
| MobileNet | 128, 160, 192, 224 |
| MobileNetV2 | 96, 128, 160, 192, 224 |
| NASNetMobile | 224 |
| NASLarge | 331 |
| Xception | >=71 |

It should be noted that the embodiments of the disclosure are not limited to the feature networks and corresponding image resolutions in Table 1. For the input layer, the user can set the input image size of the input layer according to the actual size of the check-point image to be processed (i.e., need to meet the image resolution requirements of the feature network). When the size of the actual check-point image is different from the set input image size, the model-training module 1805 can interpolate the check-point image to scale it to the set input image size.

When steps S504, S506, and S508 are completed, it indicates that the model setting is completed (S510). Next, in step S512, model parameter setting is performed. For example, field 4221 in block 422 can be used to select different optimizers such as adam, rmsprop, sgd, and nadam optimizers to provide optimization strategies for training the AI model. Field 4222 can be used to the number of epochs executed by the AI model during training. The up and down buttons next to field 4224 can adjust the learning rate of the AI model, and the increased or decreased learning rate is displayed in field 4224. Fields 4223 and 4225 can be respectively used to set the batch size used by the AI model during the training phase and testing phase.

In step S514, the setting file of the project is saved. For example, after steps S504 to S512, button 413 can be pressed to save the relevant options and settings of the AI model to the corresponding setting file for subsequent use. If there is a previously stored setting file, the user can press button 412 to read the previously stored setting file or button 411 to read the default setting file for the current user interface 400 to operate.

In step S516, it is determined whether the data stored in the directory is correct. For example, the model-training module 1805 may check whether the data (e.g., check-point images) in the training-set directory or testing-set directory is damaged or whether the format meets the requirements of the AI model. If the model-training module 1805 detects that the data in the training-set directory or testing-set directory is not damaged and the format meets the requirements of the AI model, the model-training module 1805 may determine that the data in the directory is correct, and step S518 is performed. If the model-training module 1805 detects that the data in the training-set directory or testing-set directory is damaged or the format does not meet the requirements of the AI model, the model-training module 1805 may determine that the data in the directory is incorrect, and the procedure returns to step S504.

In step S518, an output-model-data directory is created in a corresponding storage location. For example, the model-training module 1805 can create an output model directory in the path set in field 4018 for storing the trained AI model.

In step S520, the AI model is trained. For example, the model-training module 1805 may train the selected AI model according to the training-set data set in block 410 and the settings in blocks 420 to 422, such as starting the training phase of the AI model through button 414. Button 415 can be pressed to stop the training phase. When the training phase starts, the model-training module 1805 may generate or display a training-loss curve in block 440, and generate or display a training-accuracy curve in block 442, as respectively shown in FIGS. 4B and 4C. In addition, fields 433 and 434 may respectively display information about the current number of epochs and batch, and fields 435 and 436 may display the current training accuracy and current test accuracy during the training phase. For example, the model-training module 1805 may update the training-accuracy information once after each batch is completed, but will calculate and update the test-accuracy information after one epoch is completed. Accordingly, the model-training module 1805 can compare the training accuracy and the test accuracy to determine whether the AI model is overfitting.

In step S522, the training of the AI model is completed. After the training of the AI model is completed, button 416 can be pressed to save the trained AI model. If it is not desired to save the trained AI model or the training of the AI is stopped in the halfway, button 417 can be pressed to discard the training result of the AI model this time, and the AI model is not saved.

Figure 4D:
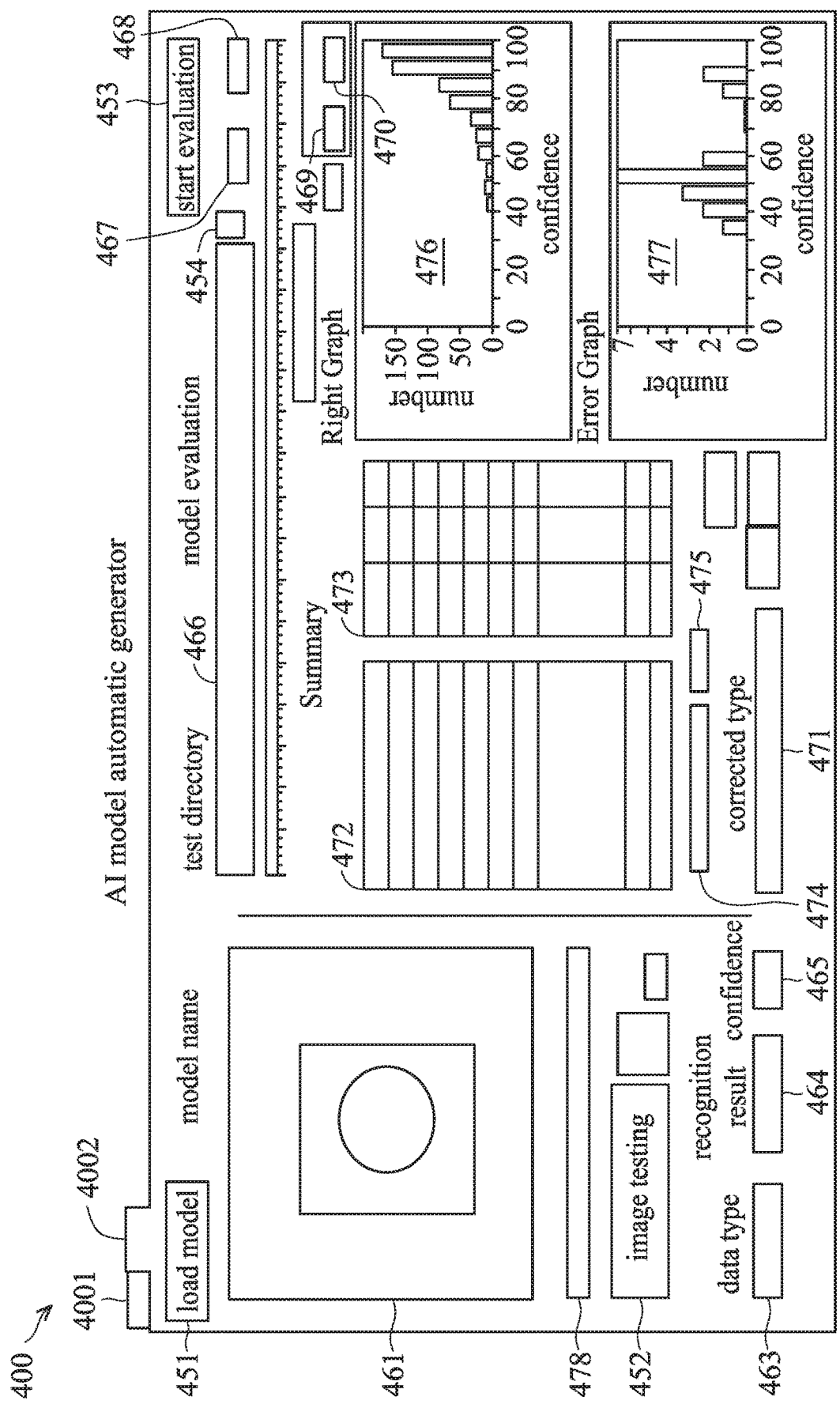
FIG. 4D is a diagram of the user interface of the module-generating program in accordance with another embodiment of the disclosure.
Figure 6:
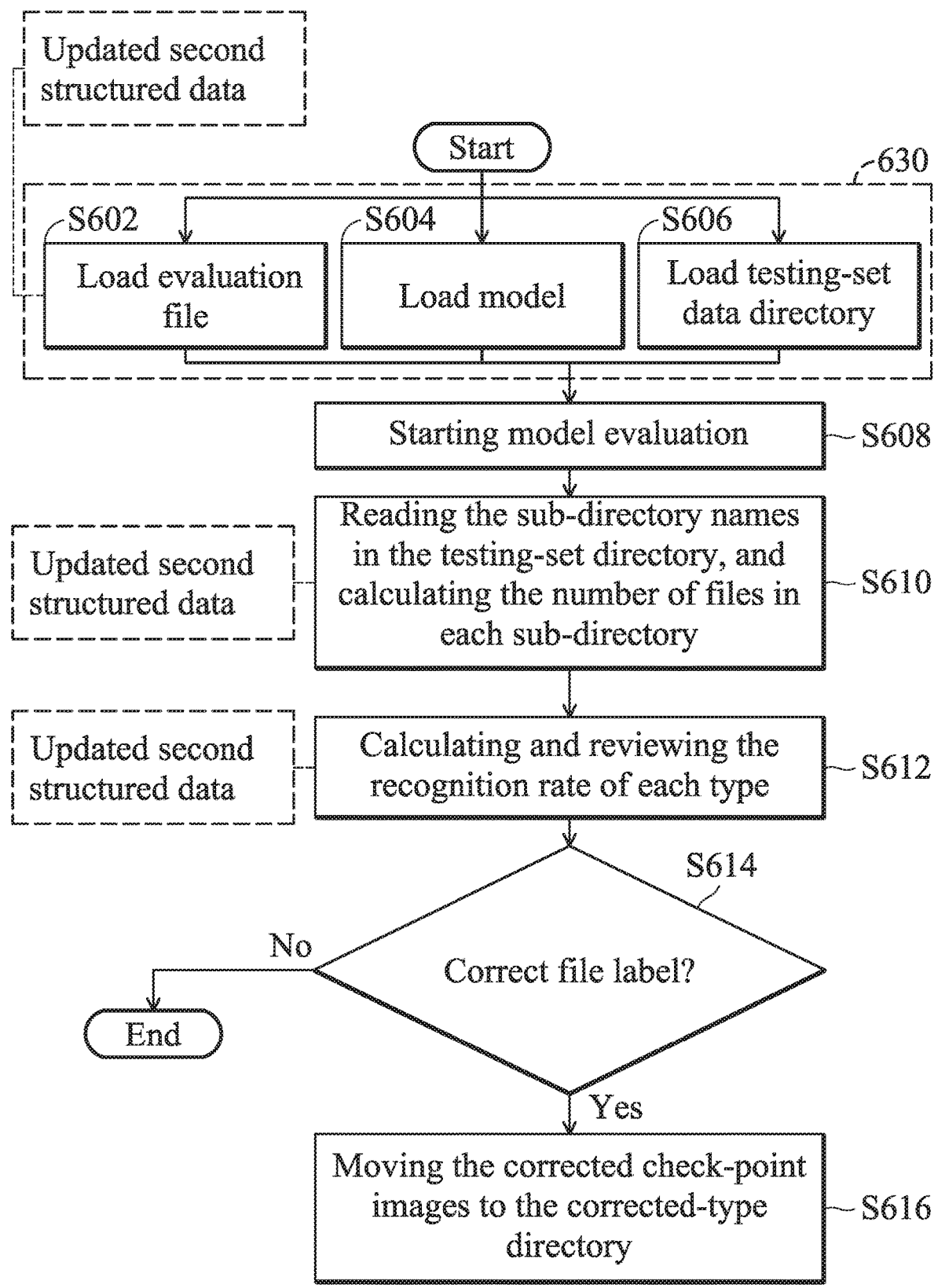
FIG. 6 is a diagram of the operation procedure of the model-evaluation module in accordance with an embodiment of the disclosure.

FIG. 4D is a diagram of the user interface of the module-generating program in accordance with another embodiment of the disclosure. FIG. 6 is a diagram of the operation procedure of the model-evaluation module in accordance with an embodiment of the disclosure.

Referring to FIG. 1, FIG. 4D, and FIG. 6. The model-evaluation module 1806 is configured to evaluate the performance of the AI model trained by the model-training module 1805 on the testing-set data in the second structured data. That is, the testing-set data can be input into the trained AI model to obtain the model evaluation of the AI model. In addition, the model-evaluation module 1806 may further use the AI model trained by the model-training module 1805 to perform data cleaning on the training-set data in the second structured data.

Block 630 may be referred to as a model-evaluation setting phase, and steps S602, S604, and S606 may be performed simultaneously or sequentially in combination of different orders. For example, the AI model stored by the model-training module 1805 can be loaded though button 451 (step S604) and the evaluation file corresponding to the AI model can be loaded (step S602). The path of the source directory of the testing-set data can be set through button 454, where the path of the source directory can be displayed in field 466, thereby loading the testing-set directory (step S606).

In step S608, model evaluation is started. For example, the evaluation phase of the AI model can be started by pressing button 453. During the evaluation phase of the AI model, the model-evaluation module 1806 may read the sub-directory names in the testing-set directory, and calculate the number of files in each sub-directory (step S610). The number of recognized check-point images and the total number of check-point images are respectively displayed in fields 467 and 468.

In step S612, the recognition rate of each type is calculated and reviewed. For example, when each check-point image in the testing-set data is input into the AI model, the AI model will generate a corresponding recognition result and confidence level. Then, the model-evaluation module 1806 may compare the recognition result of each check-point image in the testing-set data with the type labeled on each check-point in the testing-set data to calculate the model evaluation of the AI model. The model evaluation can be expressed by the recognition rate (or accuracy), such as recognition rate R=the number of correct recognition results C/the total number of check-point images in the testing-set data. By calculating the model evaluation, the group-types with a low overall recognition rate or a lower confidence level can be found.

For example, after the evaluation phase of the AI model is finished, the model-evaluation module 1806 may display the name, number of check-point images, and accuracy of each type of testing-set data in block 472, and blocks 476 and 477 may respectively display the correctness graph and error graph. Fields 469 and 470 may respectively display the ratio of undefined check-point images and the misjudgment rate. The correctness graph may indicate the numbers of check-point images with correct recognition results in different intervals of the confidence level, and the error graph may indicate the numbers of check-point images with incorrect recognition results in different intervals of the confidence level.

The user may select one of the types in block 472 for further view. For example, the selected type (e.g., aluminum_capacitor_90) is displayed in block 473. The contents of blocks 472 and 473 are respectively shown in Table 2 and Table 3:

TABLE 2

| Type name | Number of images | Accuracy (%) |
| --- | --- | --- |
| aluminum_capacitor_0 | 150 | 97.33 |
| aluminum_capacitor_180 | 150 | 94.67 |
| aluminum_capacitor_270 | 150 | 92.67 |
| aluminum_capacitor_90 | 150 | 97.33 |

TABLE 3

| Type name | Number of images | Accuracy |
| --- | --- | --- |
| aluminum_capacitor_0 | 146 | 92.46 |
| aluminum_capacitor_180 | 142 | 97.18 |
| aluminum_capacitor_270 | 139 | 95.68 |
| aluminum_capacitor_90 | 146 | 95.89 |

In Table 2 of block 472, while calculating the accuracy of each type, the number of check-point images in each type of testing-set data is set as the denominator, and the number of check-point images in each type determined by the AI model is set as the numerator. For example, if a specific type (e.g., aluminum_capacitor_180) in the testing-set data includes 150 check-point images and corresponding correct labels, the denominator is 150. If the AI model determines that the number of check-point images in the specific type is 142, the numerator is 142. Thus, in Table 2, the AI model may calculate the accuracy (e.g., the first accuracy) for the specific type is 142/150=94.67%. The accuracy of each of other types in Table 2 can be calculated in a similar manner.

In Table 3 of block 473, while calculating the accuracy of each type, the number of check-point images in each type determined by the AI model is set as the denominator, and the number of occurrences, that the recognition results of the AI model are consistent with the labels of the check-point images in each type of testing-set data, is set as the numerator. For example, if the AI model determines that there are 142 check-point images belonging to the specific type (e.g., aluminum_capacitor_180) is 142, the denominator is 142. If the number of check-point images that are correctly recognized as the specific type is 138 (i.e., it indicates that 4 check-point images are erroneously recognized as the specific type), the numerator is 138. Accordingly, in Table 3, the accuracy (e.g., the second accuracy) for the specific type is 138/142=97.18%. The accuracy of each of other types in Table 3 can be calculated in a similar manner.

Therefore, the model-evaluation module 1806 can know the recognition capability of the AI model for the check-point images in each type using the first accuracy calculated from Table 2 and the second accuracy calculated from Table 3, thereby reviewing each check-point image in the type with a lower accuracy.

In addition, the user can also manually view the check-point images in each type of testing-set data in the user interface 400, wherein the currently viewed check-point image and its image information are respectively shown in block 461 and field 478. When the button 452 is pressed, the model-evaluation module 1806 may input the currently viewed check-point image into the AI model, and display the data type, recognition result, and confidence level of the currently viewed check-point image in fields 463, 464, and 465. If the recognition result in field 464 is incorrect, the type name of the recognition result is shown in field 471, and the user may manually modify it to the correct type name. Specifically, the model-evaluation module 1806 may filter out the check-point images having incorrect recognition results from the testing-set data, and correct the types of these check-point images. For example, in the correction operation, the model-evaluation module 1806 may move the check-point images, that need to be corrected, from the original type directories to the corrected type directories corresponding to the correct recognition result.

The recognition result and the corresponding number of check-point images are respectively shown in fields 474 and 475, wherein the recognition result may be, for example, "correct recognition with high confidence level", "correct recognition with low confidence level", "incorrect recognition with high confidence level", and "incorrect recognition with low confidence level". For example, if the model-evaluation module 1806 compares the recognition result of each check-point image in the testing-set data with the type labeled on each check-point image of the testing-set data, the recognition results of some check-point images in the testing-set data may be incorrect, but with a high confidence level, it can be determined that check-point images corresponding these recognition results may be labeled incorrectly. Accordingly, the model-evaluation module 1806 may perform a first data-cleaning procedure to filter out the check-point images and recognition results that may be labeled incorrectly, and delete these check-point images from the training-set data.

If the model-evaluation module 1806 compares the recognition result of each check-point image in the testing-set data with the type labeled on each check-point image in the testing-set data, the recognition results of some check-point images in the testing-set data may be correct, but the confidence level is not high (e.g., below a threshold, where the threshold can be but not limited to 50%), indicating that the corresponding check-point image in the testing-set data may have multiple labels. That is, the same check-point image may be labeled with different group-types, so the confidence level of the recognition result of the AI model will be low. Accordingly, the model-evaluation module 1806 may perform a second data-cleaning procedure to filter out the check-point images with low confidence level in the testing-set data, and delete the check-point images, that correspond to the check-point images in the testing-set data, from the training-set data.

In step S614, it is determined whether to correct the file label. For example, after the model-evaluation module 1806 has executed the first data-cleaning procedure and second data-cleaning procedure and has updated the training-set data, the AI image-recognition program 180 may then execute the image-labeling module 1802 or image-classification module 1803 to check the filtered check-point images one by one for re-labeling. If the group labels or types of the check-point images are changed through the aforementioned correction operation, the model-evaluation module 1806 (or the image-labeling module 1802 or image-classification module 1803) will move the check-point images with the corrected labels to the correct-type directory (step S616).

If a specific check-point image will cause the AI model to misjudge in different group-types, it is inappropriate to re-label the specific check-point image and put the specific check-point back to the training-set data, and thus the image-labeling module 1802 or image-labeling module 1802 deletes the specific check-point image. In addition, the AI image-recognition program 180 may re-execute the image-generating module 1804 to further check the number of check-point images in the group-types having a lower recognition rate and/or confidence level, and generate proper simulated check-point images for these group-types to update the second structured data. Accordingly, after updating the second structured data, the model-training module 1805 may divide a new training-set data from the updated second structured data to retrain the AI model, thereby improving the recognition rate and confidence level of the recognition result of the AI model. After the AI model is retrained, the flow in FIG. 6 can be performed again, and steps S602 and S610 may reflect the updated second structure data labeled in the dotted frame, and step S612 may reflect the updated data information (e.g., recognition rate and its confidence level) of the updated second structured data.

Figure 7:
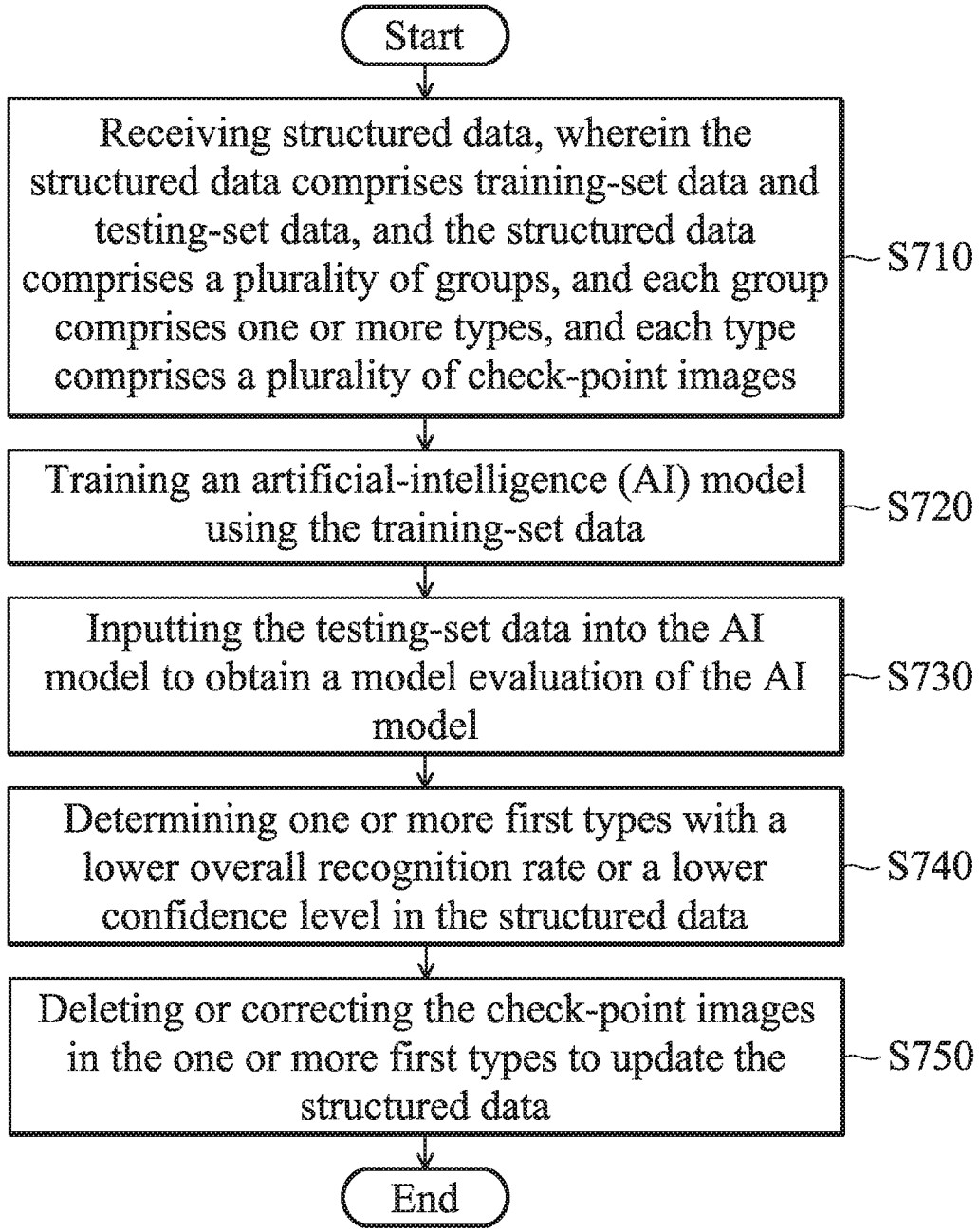
FIG. 7 is a flow chart of the image-recognition method in accordance with an embodiment of the disclosure.

FIG. 7 is a flow chart of the image-recognition method in accordance with an embodiment of the disclosure.

Referring to FIG. 2 and FIG. 7, in step S710, structured data is received, wherein the structured data includes training-set data and testing-set data, and the structured data includes a plurality of groups, and each group includes one or more types, and each type includes a plurality of check-point images. For example, the structured data in step S710 may be the second structured data generated by the image-generating module 1804 in the aforementioned embodiments. The image-generating module 1804 may randomly generate check-point images by applying different ranges of image parameters, and the generated check-point images can be regarded as simulated check-point images. After the first structured data is processed by the image-generating module 1804, the total number of original check-point images and simulated check-point images in the same group of the second structured data are the same, and the second structured data can be used as input images of the AI model.

In step S720, an AI model is trained using the training-set data. The AI model may include an input layer, a transfer model, a classification layer, and an output layer, and the user may set the parameters corresponding to the input layer, transfer model, classification layer, and output layer through the user interface of the AI image-recognizing program 180, and the user may also set the strategic parameters of the AI model during the training phase, wherein the strategic parameters may include the optimizer, learning rate, epochs, and batch size.

In step S730, the testing-set data is input into the AI model to obtain a model evaluation of the AI model. For example, during the evaluation phase of the AI model, the model-evaluation module 1806 may input each check-point image in the testing-set data into the AI model to generate a corresponding recognition result and confidence level. Then, the model evaluation module 1806 compares the recognition result of each check-point image in the testing-set data with the type labeled on each check-point image in the testing-set to obtain the model evaluation of the AI model (e.g., accuracy (or recognition rate)=the number of correct recognition results/the number of check-point images in the testing-set data).

In step S740, one or more first types with a low overall recognition rate or a lower confidence level in the structured data is determined. By using the model evaluation obtained from step S730, one or more group-types (i.e., first types) with a low overall recognition rate or a lower confidence level in the structured data can be found. In addition, the model-evaluation module 1806 may re-detect that the check-point images with incorrect recognition results but high confidence levels in the testing-set data are erroneously labeled. The model-evaluation module 1806 may also re-detect that the check-point images with correct recognition results but low confidence levels have multiple labels.

In step S750, the check-point images corresponding to the one or more first types are deleted or corrected to update the structured data. For example, in step S750, the first data-cleaning procedure and second data-cleaning procedure in the aforementioned embodiments can be executed to delete the check-point images that are erroneously labeled or have multiple labels. In some other embodiments, the model-evaluation module 1806 may move the check-point images that are erroneously labeled or have multiple labels to a directory of a to-be-corrected type to update the structured data. In addition, the AI image-recognition program 180 may re-execute the image-labeling module 1802 or the image-classification module 1803 to check the filtered check-point images one by one for re-labeling. The AI image-recognition program 180 may re-execute the image-generating module 1804 (or the model-evaluation module 1806 calls the image-generating module 1804) to further view the number of check-point images in the group-type (e.g., one or more first types) with a low recognition rate or a lower confidence level, and generate appropriate simulated check-point images for these group-types to update the structured data. Accordingly, after the structured data is updated, the model-training module 1805 may divide new training-set data from the updated structured data to retrain the AI model, thereby improving the recognition rate and confidence level of the recognition result of the AI model.

In view of the above, an image-recognition apparatus, an image-recognition method, and a computer program product thereof are provided in the disclosure. The image-recognition apparatus, image-recognition method, and computer program product thereof are capable of determining the status of each check-point image in the training-set data of the structured data using the AI model. In addition, the training-set data that is the erroneously labeled or has multiple labels can be appropriately filter out via the model-evaluation procedure to update the training-set data, and the updated training-set data can be used to retrain the AI model to improve the recognition rate and confidence level of the AI model. Accordingly, it can achieve the effect of reducing the workload of the product line operators and reducing production costs.

While the disclosure has been described by way of example and in terms of the preferred embodiments, it should be understood that the disclosure is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A computer program product comprising a non-transitory computer-readable storage medium storing an artificial-intelligence (AI) image-recognition program which is executed by a computer to cause the computer to function as:
   a model-training module, configured to receive structured data, wherein the structured data comprises training-set data and testing-set data, and the model-training module trains an artificial-intelligence (AI) model using the training-set data, and the structured data comprises a plurality of groups, and each group comprises one or more types, and each type comprises a plurality of check-point images; and
   a model-evaluation module, configured to input the testing-set data into the AI model to obtain a model evaluation of the AI model,
   wherein the model-evaluation module further determines one or more first types with a lower overall recognition rate or a lower confidence level in the structured data, and deletes or corrects the check-point images in the one or more first types to update the structured data.

2. The computer program product as claimed in claim 1, wherein there is a first number of the check-point images in each group of the structured data generated by an image-generating module, and a second number of check-point images in each type of each group is obtained by dividing the first number by a number of types in each group.

3. The computer program product as claimed in claim 1, wherein the model-training module divides the structured data into the training-set data and the testing-set data according to a predetermined ratio.

4. The computer program product as claimed in claim 1, wherein the AI model comprises an input layer, a transfer model, a classification layer, and an output layer, and the model-training module defines a plurality of strategic parameters during a training procedure for the transfer model, wherein the strategic parameters includes a type of an optimizer, a learning rate, a number of epochs, and a batch size.

5. The computer program product as claimed in claim 4, wherein the model-training module further defines an image resolution used by the AI model, and the image resolution meets image-resolution requirements of the transfer model.

6. The computer program product as claimed in claim 5, wherein in response to size of the check-point images in the structured data being different from the image resolution used by the AI model, the model-training module performs interpolation on the check-point images in the structured data to scale the check-point images to the image resolution used by the AI model.

7. The computer program product as claimed in claim 1, wherein during a training phase of the AI model, the model-training module generates current training accuracy and current testing accuracy, and compares the current training accuracy and the current testing accuracy to determine whether the AI model is overfitting.

8. The computer program product as claimed in claim 1, wherein when a training phase of the AI model starts, the model-training module displays a training-loss curve and a training-accuracy curve of the AI model.

9. The computer program product as claimed in claim 1, wherein the model-evaluation module divides a number of check-point images in each type determined by the AI model by a number of the check-point images labeled in each type of the testing-set data to obtain a first accuracy for each type, and divides a number of occurrences, that recognition results of the AI model are consistent with the check-point images labeled in each type of the testing-set data, by the number of check-point images in each type determined by the AI model to obtain a second accuracy,
   wherein the model-evaluation module further determines recognition capability of the AI model for the check-point images in each type of the testing-set data according to the first accuracy and the second accuracy for each type in the testing-set data.

10. The computer program product as claimed in claim 1, wherein the model-evaluation module further filters out the check-point images that are erroneously labeled or have multiple labels.

11. The computer program product as claimed in claim 10, wherein the model-evaluation module further executes a first data-cleaning process to delete the check-point images that are erroneously labeled from the structured data to update the structured data, wherein the model-evaluation module further executes a second data-cleaning process to filter out the check-point images that have multiple labels, and deletes the check-point images from the structured data to update the structured data.

12. The computer program product as claimed in claim 10, wherein the model-training module further moves the check-point images that are erroneously labeled or have multiple labels to a directory of a to-be-corrected type to update the structured data.

13. The computer program product as claimed in claim 12, wherein after the model-evaluation module has executed the first data-cleaning procedure and the second data-cleaning procedure and has updated the training-set data, the model-evaluation module further calls an image-labeling module or an image-classification module of the AI image-recognition program to check the filtered check-point images one by one for re-labeling, wherein after group labels or types of the filtered check-point images are changed after re-labeling, the model-evaluation module further moves the check-point images with corrected labels to a corrected-type dictionary.

14. The computer program product as claimed in claim 1, further comprising: an image-generating module, and the model-evaluation module further calls the image-generating module to further view each check-point image in the one or more first types, and generate a plurality of simulated check-point images for the one or more first types to update the structured data.

15. The computer program product as claimed in claim 14, wherein the model-training module further divides new training-set data from the updated structured data to retrain the AI model.

16. An image-recognition method, comprising:
receiving structured data, wherein the structured data comprises training-set data and testing-set data, and the structured data comprises a plurality of groups, and each group comprises one or more types, and each type comprises a plurality of check-point images;
training an artificial-intelligence (AI) model using the training-set data;
inputting the testing-set data into the AI model to obtain a model evaluation of the AI model; and
determining one or more first types with a lower overall recognition rate or a lower confidence level in the structured data, and deletes or corrects the check-point images in the one or more first types to update the structured data.

17. An image-recognition apparatus, comprising:
a non-volatile memory, configured to store a model-generating program; and
a processor, configured to execute the model-generating program to perform the following steps:
receiving structured data, wherein the structured data comprises training-set data and testing-set data, and the structured data comprises a plurality of groups, and each group comprises one or more types, and each type comprises a plurality of check-point images;
training an artificial-intelligence (AI) model using the training-set data;
inputting the testing-set data into the AI model to obtain a model evaluation of the AI model; and
determining one or more first types with a lower overall recognition rate or a lower confidence level in the structured data, and deletes or corrects the check-point images in the one or more first types to update the structured data.

* * * * *